US011449299B2

(12) United States Patent
Schapiro et al.

(10) Patent No.: US 11,449,299 B2
(45) Date of Patent: Sep. 20, 2022

(54) INITIATING AND DETERMINING VIEWING DISTANCE TO A DISPLAY SCREEN

(71) Applicant: PARSEMPO LTD., Jerusalem (IL)

(72) Inventors: Avi Moshe Schapiro, Hod Hasharon (IL); Ephraim Matityahu Tabackman, Efrat (IL)

(73) Assignee: Parsempo Ltd., Jerusalem (IL)

( * ) Notice: Subject to any disclaimer, the term of this patent is extended or adjusted under 35 U.S.C. 154(b) by 152 days.

(21) Appl. No.: 16/929,639

(22) Filed: Jul. 15, 2020

(65) Prior Publication Data
US 2021/0004190 A1 Jan. 7, 2021

(30) Foreign Application Priority Data
Jul. 2, 2019 (GB) .................................... 1909519

(51) Int. Cl.
*G06F 3/147* (2006.01)
*H04N 5/232* (2006.01)
(Continued)

(52) U.S. Cl.
CPC .......... *G06F 3/147* (2013.01); *G06F 3/04847* (2013.01); *G06T 7/60* (2013.01);
(Continued)

(58) Field of Classification Search
CPC ....... G06F 3/147; G06F 3/04847; G06T 7/60; G06T 7/70; G06T 7/73; G06T 7/97;
(Continued)

(56) References Cited

U.S. PATENT DOCUMENTS 6,292,227 B1 * 9/2001 Wilf ....................... H04N 5/272
348/592
7,098,869 B2 8/2006 Valtekunas et al.
(Continued)

FOREIGN PATENT DOCUMENTS

EP 1056281 A1 * 11/2000 ........... H04N 5/2628
GB 2305051 B 6/2000
(Continued)

OTHER PUBLICATIONS

In Store Signs Get Smart, MIT Technology Review, Kate Greene, Dec. 16, 2010.
(Continued)

*Primary Examiner* — David D Davis
(74) *Attorney, Agent, or Firm* — Dr. Hanan Farber Patent Agent Ltd.

(57) ABSTRACT

Initiating a display screen for presenting information in a public environment. A camera is pointed toward the display screen is panned while capturing multiple image frames from the environment surrounding the camera. During the panning, respective pan and tilt angles of the camera are stored. The image frames and the respective pan and tilt angles are analysed to identify an image of the environment facing the display screen. An image sensor is associated with the display screen. An image feature captured from the image sensor is matched with an image feature captured from the camera of the environment facing the display screen.

18 Claims, 10 Drawing Sheets

(51) Int. Cl.
*G06T 7/60* (2017.01)
*G06F 3/04847* (2022.01)
*G06T 7/70* (2017.01)
*G06V 10/75* (2022.01)
*G09F 15/00* (2006.01)

(52) U.S. Cl.
CPC .............. *G06T 7/70* (2017.01); *G06V 10/751* (2022.01); *H04N 5/23238* (2013.01); *H04N 5/23293* (2013.01); *H04N 5/23299* (2018.08); *G09F 15/0006* (2013.01)

(58) Field of Classification Search
CPC ...... G06V 10/751; G06V 10/17; G06V 10/22; H04N 5/23238; H04N 5/23293; H04N 5/23299; H04N 5/232935; H04N 5/232939; H04N 17/04; H04N 21/4126; H04N 21/4223; G09F 15/0006; G09G 2320/068; G09G 2320/0693; G09G 2340/0492; G09G 2354/00; G09G 2380/06
See application file for complete search history.

(56) References Cited

U.S. PATENT DOCUMENTS

| | | | |
|---|---|---|---|
| 7,620,026 | B2 | 11/2009 | Anshutz et al. |
| 10,101,885 | B1* | 10/2018 | Dand .................. G06F 3/0304 |
| 10,181,253 | B2 | 1/2019 | Anaya |
| 2008/0243614 | A1 | 10/2008 | Tu et al. |
| 2009/0197616 | A1 | 8/2009 | Lewis et al. |
| 2009/0217315 | A1 | 8/2009 | Malik et al. |
| 2014/0085524 | A1 | 3/2014 | Berglund et al. |
| 2014/0122248 | A1 | 5/2014 | Kuzama et al. |
| 2014/0337137 | A1 | 11/2014 | Robertson et al. |
| 2017/0323458 | A1* | 11/2017 | Lablans .................. H04N 7/18 |
| 2019/0088175 | A1 | 3/2019 | Isaacs et al. |

FOREIGN PATENT DOCUMENTS

| | | | |
|---|---|---|---|
| RU | 2686154 C1 | 4/2019 | |
| WO | WO-9709822 A1 * | 3/1997 | ........... H04N 5/2628 |

OTHER PUBLICATIONS

Real-Time Bidding, A New Frontier of Computational Advertising Research Jun Wang and Shuai Yuan University College London, Kaihua Cai, WSDM, Shanghai, Jan. 31, 2015.
GB1909519.9 Combined Search and Examination Report of the UKIPO.

* cited by examiner

Landscape Orientation

Portrait Orientation

PAN

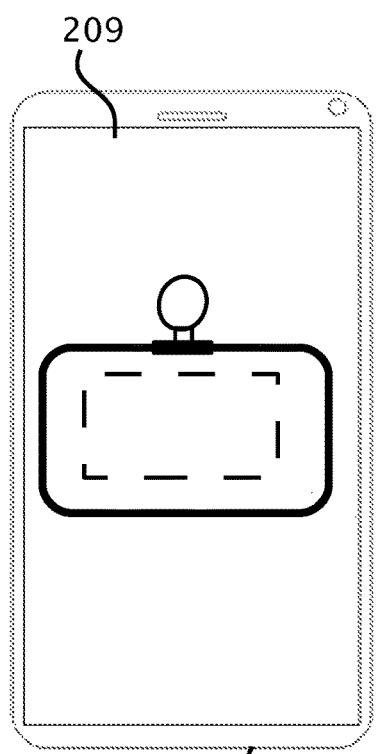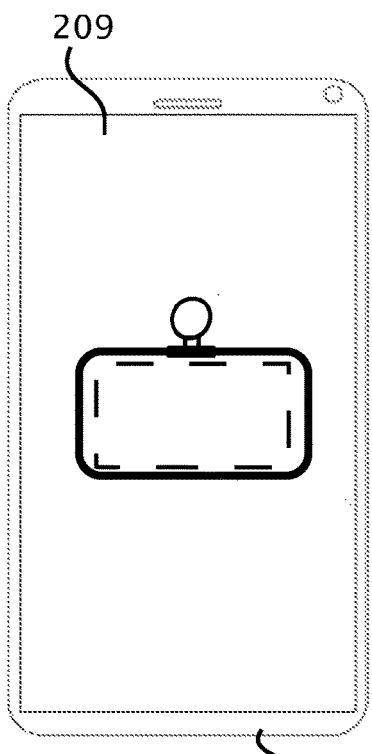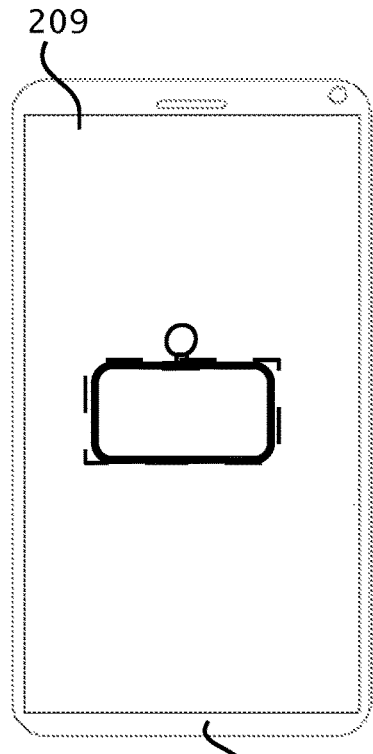
*Fig. 4A*  *Fig. 4B*  *Fig. 4C*
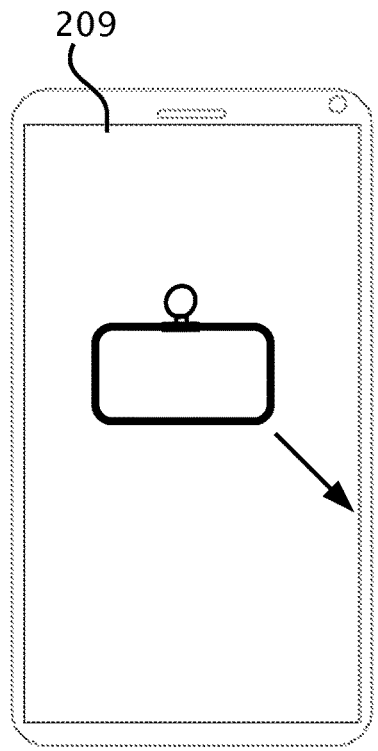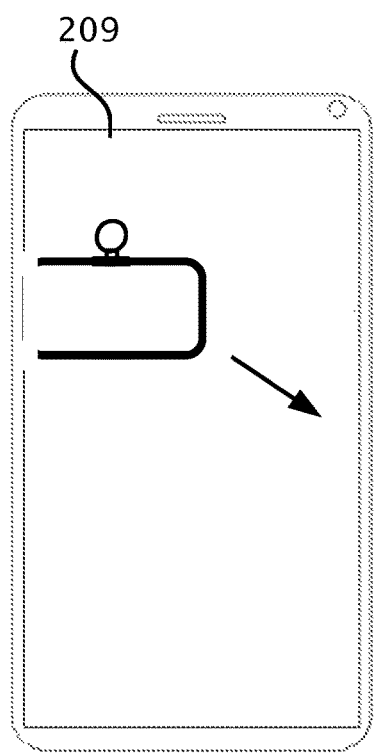
*Fig. 5A*  *Fig. 5B*

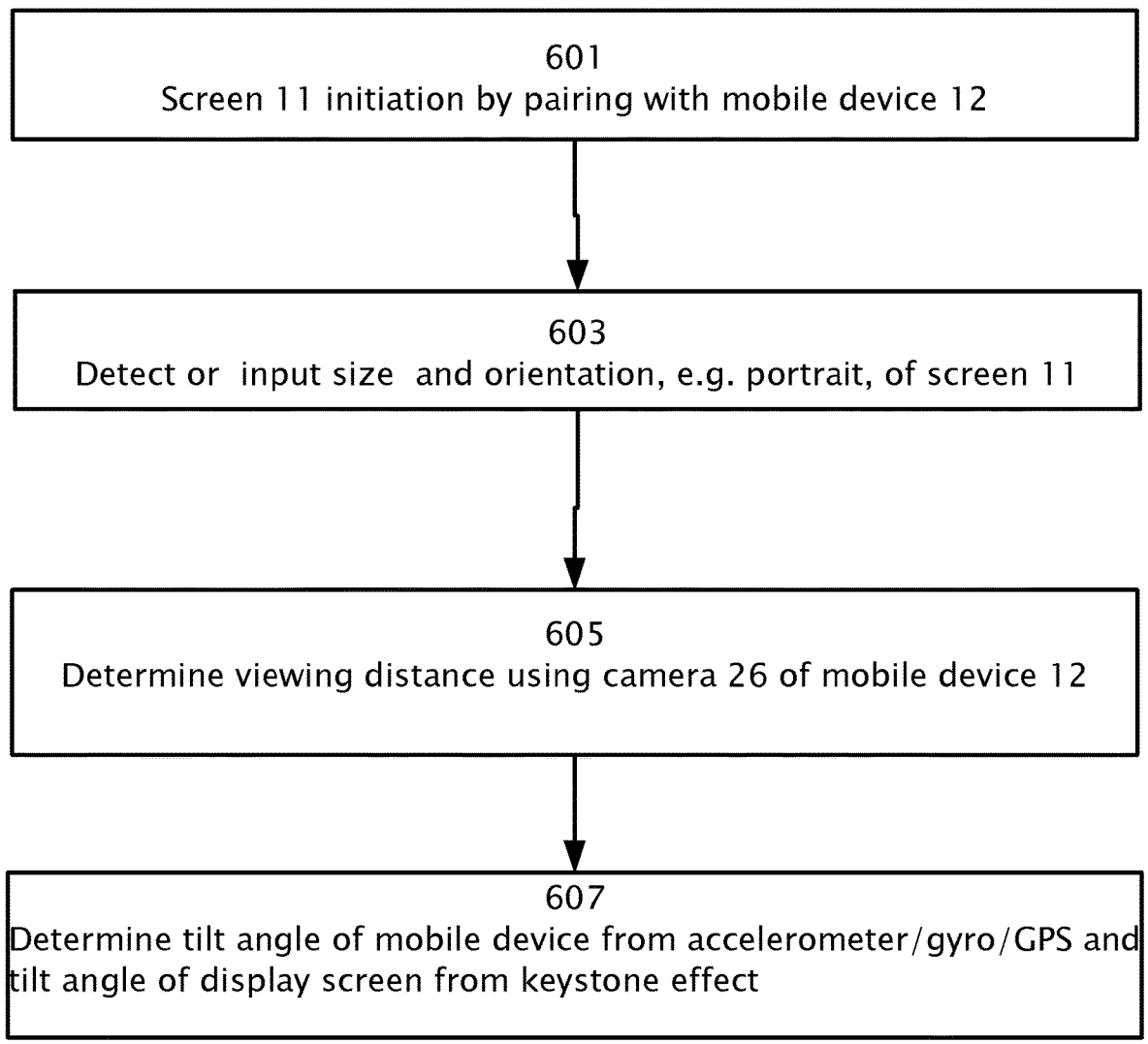
Fig. 6

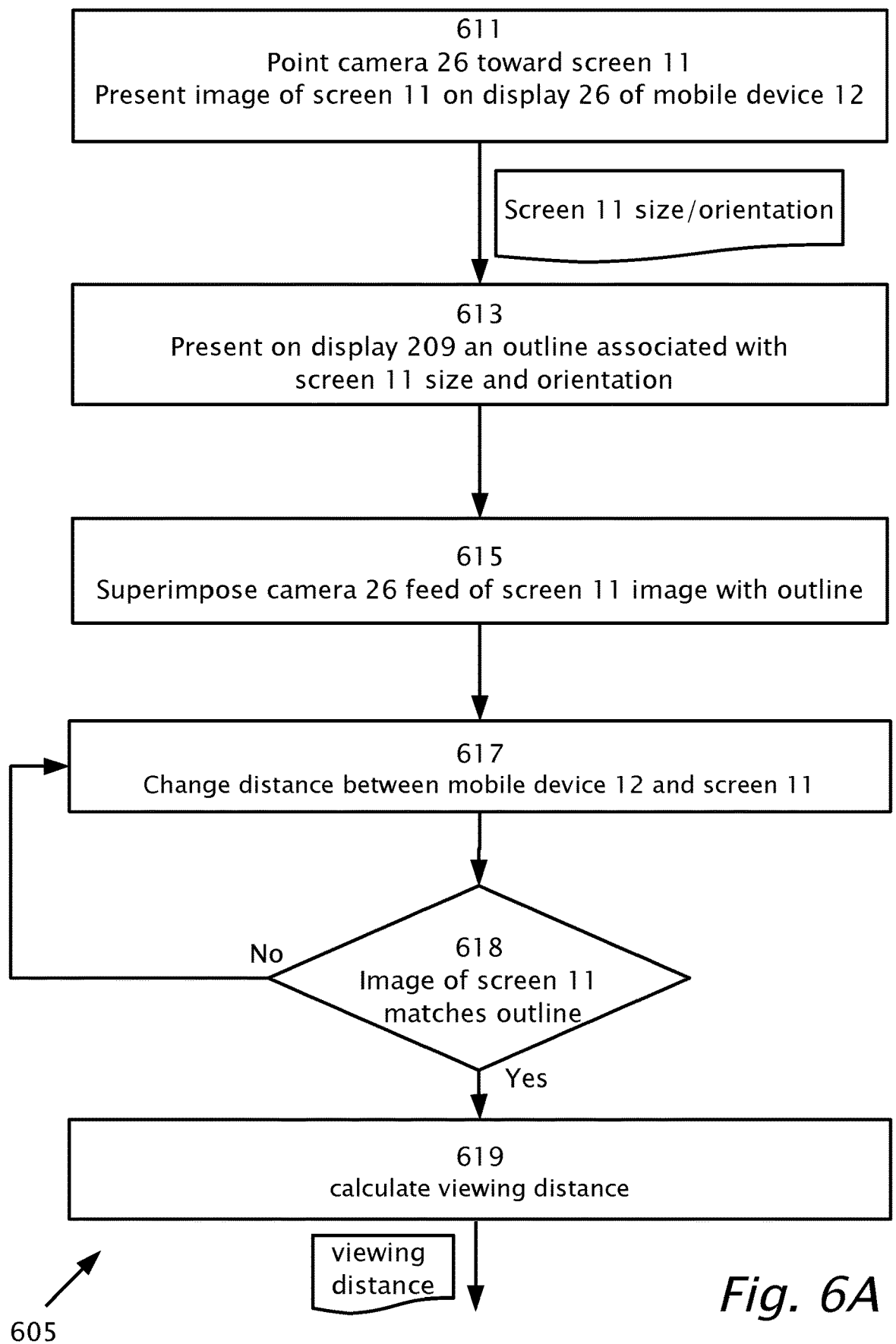

INITIATING AND DETERMINING VIEWING DISTANCE TO A DISPLAY SCREEN

BACKGROUND

1. Technical Field

The present invention relates to digital billboards or display screens installed in a public environment.

2. Description of Related Art

The billboard marketplace has developed a great deal with the introduction of digital display screens, also known as digital billboards which may be located either outdoors or indoors. Digital billboards and other similar displays allow one physical billboard space to present multiple pieces of digital content over a period of time, by sharing and rotating between various pieces of digital content. Digital billboards provide significant advantages over traditional static billboards, since digital displays are linked to computer systems that can instantaneously and simultaneously change the digital content on a large number of digital billboard displays.

Thus, there is a need for and it would be advantageous to have an system and method for setting up and monitoring operation of digital display screens for the purpose of presenting information in a public environment.

BRIEF SUMMARY

Various systems and methods are disclosed herein, for initiating a display screen for presenting information in a public environment, e.g airport, hospital. A camera is pointed toward the display screen. The camera is panned while capturing multiple image frames from the environment surrounding the camera. During the panning, respective pan and tilt angles of the camera are stored respectively associated with capture times of the image frames. Upon completing capture of the image frames, the image frames and the respective pan and tilt angles are analysed to identify an image of the environment facing the display screen. An image sensor is associated with and installed in the vicinity of the display screen or an image sensor is attached to the display screen. Image frames are captured from the image sensor from a portion of the environment. An image feature captured from the image sensor is matched with an image feature captured from the camera of the environment facing the display screen. An object may be displayed on the display screen. An image frame may be captured from the camera including at least a portion of the display screen. The panning of the camera and the image capture from the capture may be performed upon identifying the object displayed on the display screen. The image frames from the camera and the respective pan and tilt angles may be uploaded to a server and analysed at the server. Responsive to a previously determined viewing distance from the display screen of persons expected to be exposed to the display screen, an angle of the image sensor and/or a position of the image sensor may be adjusted. The adjustment may be performed by providing directional instructions on the display screen. During the adjustment, a video feed from the image sensor may be presented on the display screen. Upon completing the adjustment, the matched image feature captured from the image sensor and from the camera may be selected as an anchor point in an image frame captured from the image sensor. During operation of presenting information by the display screen, an image frame captured from the image sensor including the anchor point is uploaded to the server. Upon a change of an image coordinate of the anchor point greater than a previously determined threshold, the operation of presenting externally provided information on the display screen may be stopped.

Various systems and methods are disclosed herein, for initiating a display screen for presenting information in a public environment including determining a viewing distance to the display screen. A mobile device may include or may be connected to the camera and a display. The camera of the mobile device may be pointed toward the display screen. An image of the display screen may be presented on the display of the mobile device. Screen size and orientation of the display screen may be determined from an image frame captured from the camera. Alternatively, a screen size and orientation of the display screen may be input using an input mechanism of the mobile device. Responsive to the screen size and orientation of the display screen, an outline may be presented on the display of the mobile device. While the mobile device is pointed toward the display screen and an image of the display screen is presented on the display of the mobile device, distance of the mobile device from the display screen may be changed until an image of the display screen matches the outline associated with the screen size and orientation of the display screen. Pairing the mobile device with the display screen may be performed by inputting into the mobile device a unique code displayed on the display screen. Upon pairing, a location of the mobile device associated with a location of the display screen may be provided and uploaded to the server.

Various graphical user interfaces are disclosed herein, for initiating a display screen for presenting information in a public environment, e.g airport, hospital. The graphical user interface includes: an instruction to point a camera toward the display screen, an instruction to pan the camera and to capture image frames from the camera from an environment surrounding the display screen. Pan and tilt angles of the camera are stored associated respectively with capture times of the image frames. When the capture of the image frames is complete, the graphical user interface includes an indication that the capture of the image frames is complete and the image frames and the respective pan and tilt angles of the camera are uploaded. The graphical user interface may further include an indication that an object displayed on the display screen is identified and an indication that an image frame captured from the image sensor may be successfully matched with the image of the environment captured from the camera facing the display screen.

Various graphical user interfaces of the mobile device are disclosed herein for determining the viewing distance from the display screen: The graphical user interface includes: a field for inputting a screen size and orientation of the display screen using an input mechanism of the mobile device or for presenting display screen size and orientation of the display screen, an outline associated with the display screen size and orientation of the display screen; an image of the display screen superimposed on the outline; and an indication that the viewing distance is determined when an image of the display screen matches the outline. The graphical user interface may include: a message for pairing the mobile device with the display screen by inputting into the mobile device a unique code displayed on the display screen.

Various methods for initiating a display screen for presenting information include pointing a camera toward the display screen, panning and tilting the camera while capturing multiple mage frames from the camera from an environment surrounding the camera. The tilting is responsive to a height of the display screen and/or the tilt angle of the display screen. While panning and tilting, respective pan and tilt angles of the camera are stored respectively associated with capture times of the image frames. Upon completion of the image capture the image frames and the respective pan and tilt angles are analysed to identify an image of the environment facing the display screen. Screen size and orientation of the display screen may be determined from an image frame captured from the camera. Alternatively, a screen size and orientation of the display screen may be input using an input mechanism of the mobile device. Responsive to the screen size and orientation of the display screen, an outline may be presented on the display of the mobile device. The outline may be associated with the display screen size and orientation of the display screen. While the mobile device is pointed toward the display screen an image of the display screen is presented on the display of the mobile device, distance of the mobile device from the display screen may be changed until an image of the display screen matches the outline associated with the screen size and orientation of the display screen. The distance at which the outline matches the image of the display screen is a viewing distance from the display screen. An object may be displayed on the display screen. An image frame may be captured from the camera including part of the display screen while the camera is at the viewing distance from the display screen of persons expected to be exposed to the display screen. Panning, tilting of the camera and the capture of image frames may be performed upon identifying the object displayed on the display screen. An image sensor may be associated with and installed in the vicinity of the display screen or attached to the display screen. Image frames may be captured from the image sensor from a portion of the environment. An image feature captured from the image sensor may be matched with an image feature captured from the camera of the environment facing the display screen. Responsive to the viewing distance from the display screen: an angle of the image sensor and/or a position of the image sensor may be adjusted. The adjustment may be performed by providing directional instructions on the display screen. Upon completing the adjustment, the matched image feature captured from the image sensor and from the camera may be selected as an anchor point in an image frame captured from the image sensor. During operation of information presentation by the display screen, an image frame captured from the image sensor including the anchor point may be uploaded. Upon a change of an image coordinate of the anchor point greater than a previously determined threshold, the operation of presentation of externally provided information on the display screen may be stopped.

Various non-transitory computer-readable-media are disclosed herein having software instructions stored therein to perform various methods as disclosed herein.

BRIEF DESCRIPTION OF THE DRAWINGS

The invention is herein described, by way of example only, with reference to the accompanying drawings, wherein:

FIGS. 4A, 4B and 4C illustrate sequentially a display of a mobile device while a user is determining a viewing distance from the display screen, according to features of the present invention;

FIGS. 5A and 5B illustrate sequentially a display of a mobile device while a user is directed to pan and/or tilt the camera, according to features of the present invention;

FIG. 6 shows a flow diagram illustrating a method, according to an embodiment of the present invention;

FIG. 6A illustrates further details of determining a viewing distance from the display screen, according to embodiments of the present invention;

Figure 1:
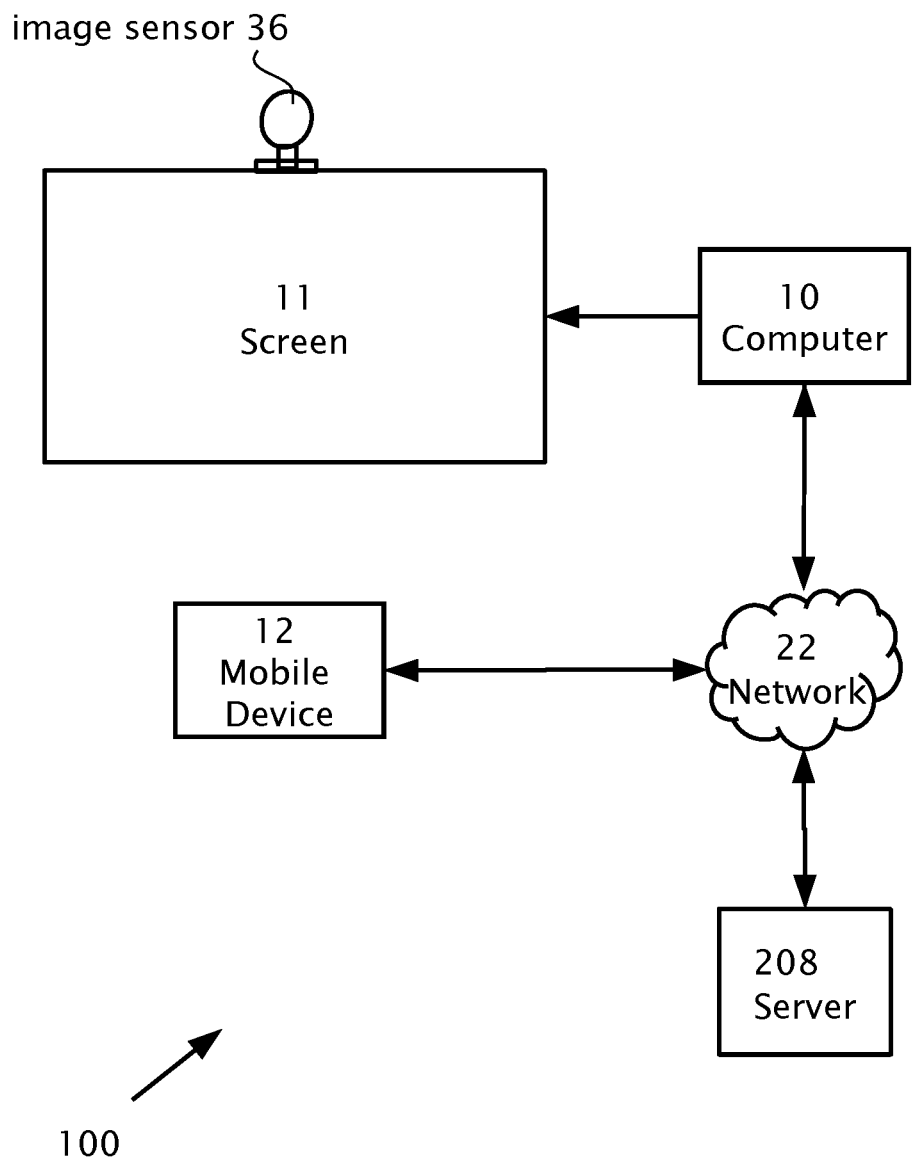
FIG. 1 illustrates schematically a system, according to embodiments of the present invention.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to like elements throughout. The features are described below to explain the present invention by referring to the figures.

Before explaining features of the invention in detail, it is to be understood that the invention is not limited in its application to the details of design and the arrangement of the components set forth in the following description or illustrated in the drawings. The invention is capable of other features or of being practised or carried out in various ways. Also, it is to be understood that the phraseology and terminology employed herein is for the purpose of description and should not be regarded as limiting.

By way of introduction, various embodiments of the present invention are directed to a system, method and graphical user interface for installing an electronic display screen in a public area for the purpose of presenting information. Information presented on the screen may include externally provided content, such as traffic information in a road environment, flight information at an airport, and/or emergency services information in a public area as well as presenting advertisements. Various embodiments of the present invention are directed to a system, method and graphical user interface for positioning and orienting an associated image sensor for inputting environmental information (e.g. demographic information) in the vicinity of the display screen. Environmental information gathered by visual sensor may include whether people are viewing and/or responding to the information presented on the electronic display.

Referring now to the drawings, reference is now made to FIG. 1 which illustrates schematically a system 100, according to embodiments of the present invention. System 100 includes a display screen 11, a camera or image sensor 36 attached to or otherwise associated with display screen 11. Display screen 11 is attached to or incorporates a computer 10. Software program may be installed on computer 10 for operating display screen 11 and for capturing image frames or video feed from image sensor 36. Computer 10 may be attached to a data network 22 which may include a server 208. Mobile device 12 is in the vicinity of display screen 11 connectible to network 22.

Figure 2:
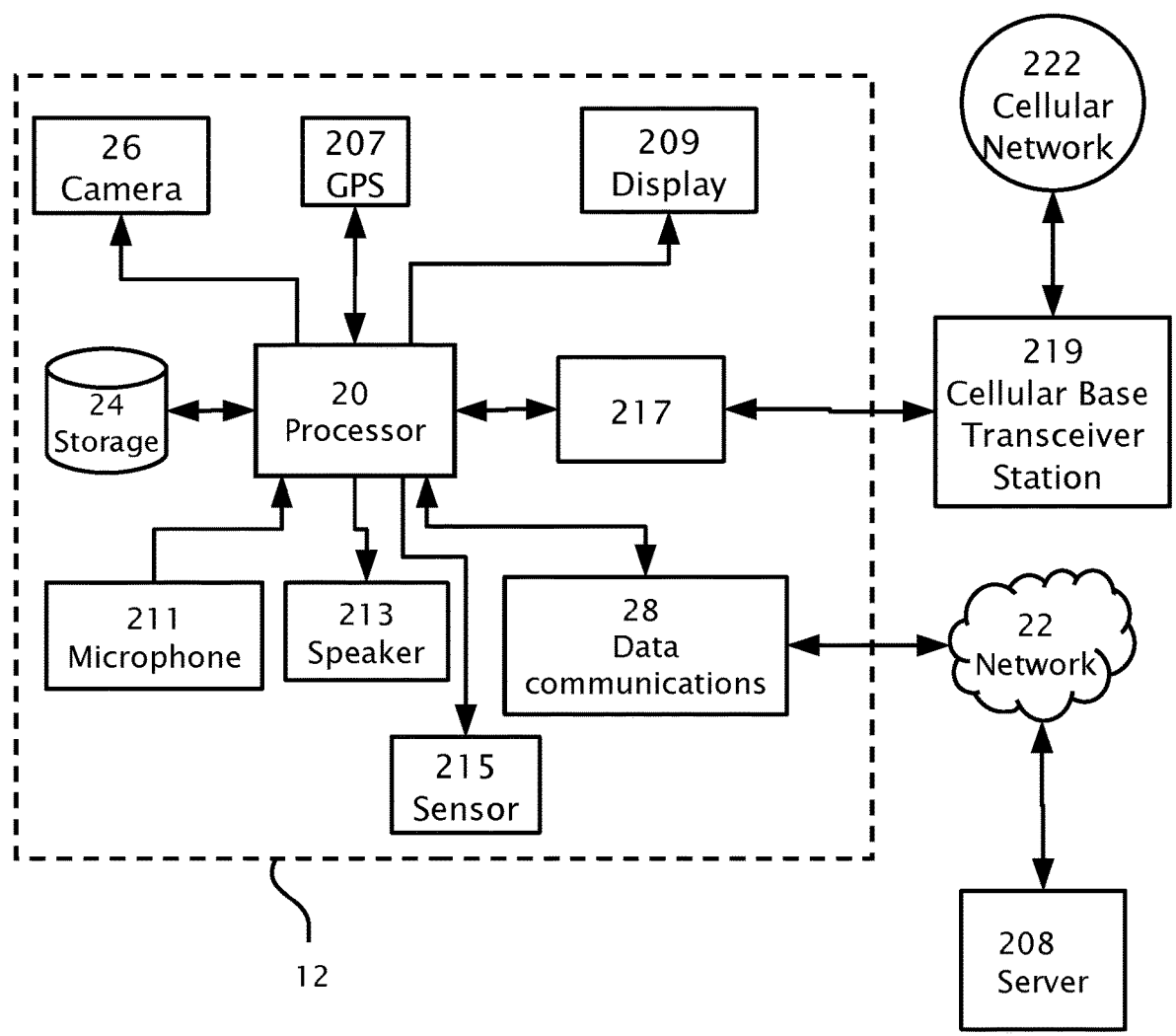
FIG. 2 illustrates a simplified block diagram of mobile computer system or mobile device according to features of the present invention.

Reference is now also made to FIG. 2 which illustrates a simplified block diagram of mobile computer system or mobile device 12 according to features of the present invention. Mobile device 12 is connectible over data network 22 to server 208. Mobile device 12 is also connectible through a cellular base station transceiver 219 to the remainder of cellular network 222. Mobile device 12 includes a processor 20 connected to local data storage 24. A data communications module 28 connects processor 20 to data network 22. A cellular communications module 217 connects processor 20 to cellular network 222. Mobile device 12 may include connected to processor 20, peripheral accessory devices such as a display 209, global positioning system (GPS) 207, camera 26, a microphone 211, a speaker 213, a sensor 215, e.g. accelerometer/gravity sensor, gyroscopic sensor, infra-red sensor (not shown). Mobile device 12 may be for example an iPhone™ of Apple™ Inc., or a smartphone configured to run an Android™ open operating system or a tablet such as iPad™ or a tablet running on an Android™ operating system, by way of example.

Figure 3A:
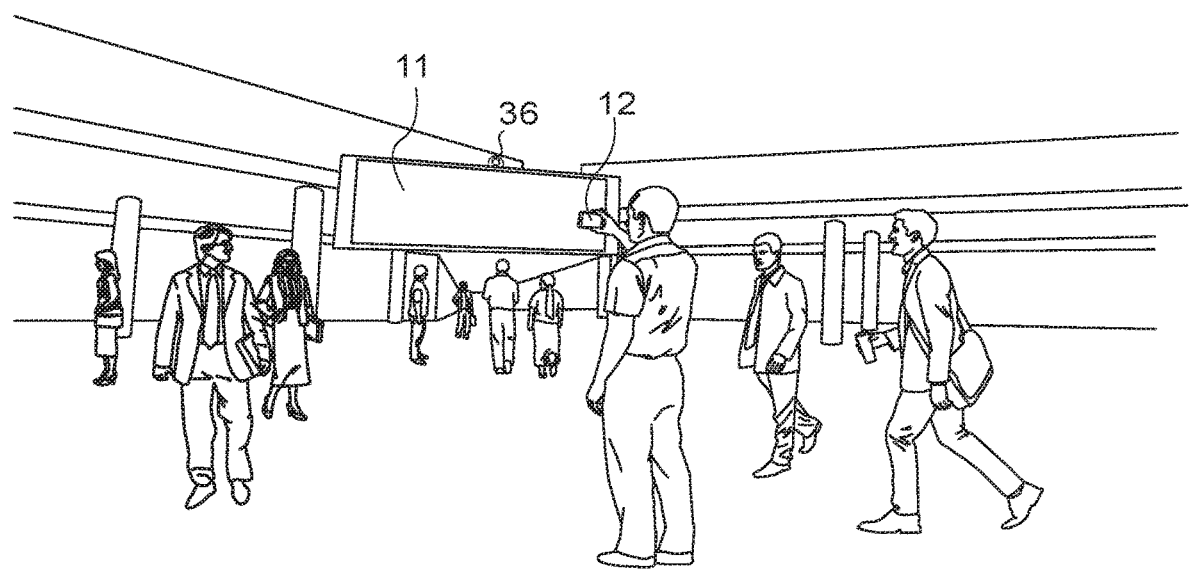
FIG. 3A is an isometric view illustrating a user installing, according to features of the present invention, a digital display screen in a public place.
Figure 3B:
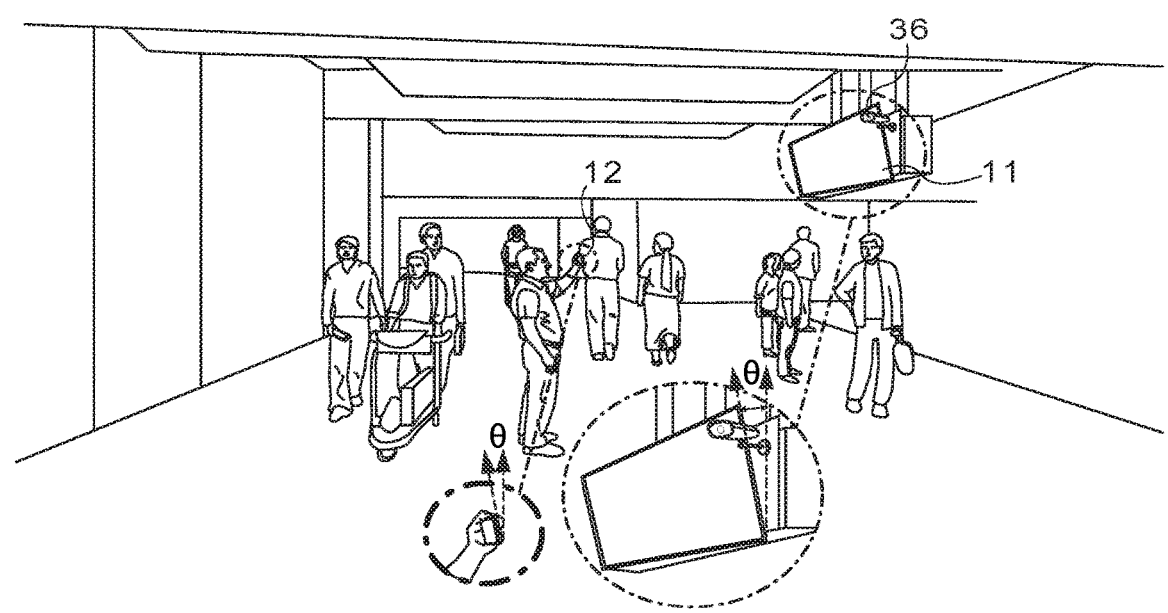
FIG. 3B is a side view of a user installing, according to features of the present invention, a digital display screen in a public place.

Reference is now also made to FIGS. 3A and 3B, which illustrate, by way of example, public environments in which the present invention may be practiced. FIG. 3A may be inside an airport terminal. Display screen 11 may display, for instance, air traffic information. Visual sensor 36 shown mounted on top of display screen 11 may capture images from inside the terminal. A person, or user, is shown holding mobile device 12 appearing to capture images from display screen 11. FIG. 3B illustrates a scene which appears to be a hall in a hospital. Display screen 11 is shown as wall mounted. Separately mounted along side display screen 11 is visual sensor 36. A person or user is shown holding mobile device 12 appearing to capture images from display screen 11.

Figure 3C:
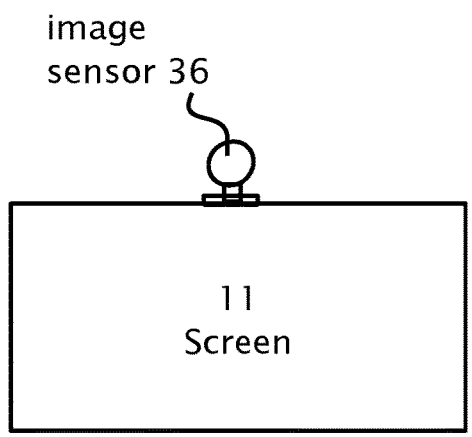
FIG. 3C illustrates landscape orientation of a display screen, according to a feature of the present invention.
Figure 3D:
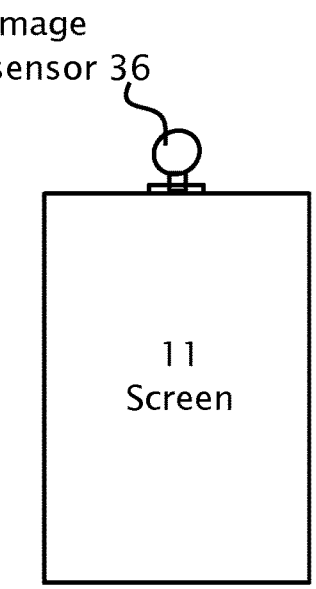
FIG. 3D illustrates portrait orientation of a display screen, according to a feature of the present invention.
Figure 3E:
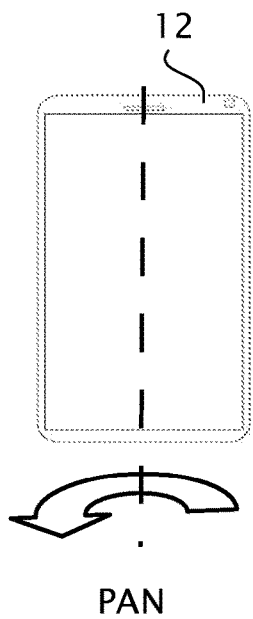
FIG. 3E illustrates a front view of a mobile device including a pan angle of a camera, according to a feature of the present invention.
Figure 3F:
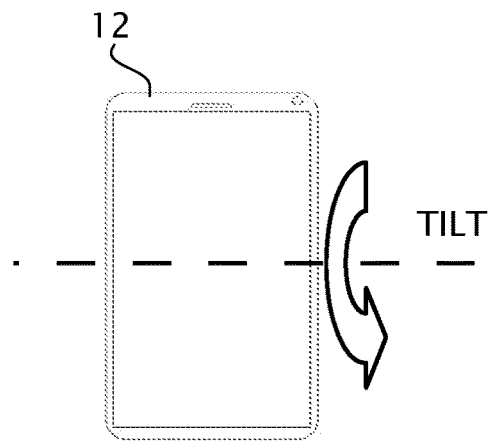
FIG. 3F illustrates a front view of a mobile device including a tilt angle of a camera, according to a feature of the present invention.

Reference is now also made to FIGS. 3C, 3D, 3E and 3F which illustrate definitions which are used in the present description. FIG. 3C illustrates display screen 11 in a landscape orientation. The term "landscape orientation" as used herein refers to a rectangular display in which the longer side is essentially horizontal. FIG. 3D illustrates display screen 11 in a portrait orientation. The term "portrait orientation" as used herein refers to a rectangular display in which the longer side is essentially vertical. FIG. 3E illustrates a mobile device 12 which includes camera 26 (on back side, not shown in front view). A vertical axis through mobile device 12 (dashed line) is shown. A circular arrow shows rotation about the vertical axis which is known as "panning". FIG. 3F also illustrates a mobile device 12 which includes camera 26 (not shown on back side). A horizontal axis through mobile device 12 (dashed line) is shown. A circular arrow shows rotation about the horizontal axis which is known as "tilting". The term "pan angle" or panning as used herein refers rotation about a vertical rotation axis. The term "tilt angle" or tiling as used herein refers to rotation about a horizontal rotation axis.

Reference is now also made to FIG. 6, illustrating a process 60 of display screen 10 initiation, according to features of the present invention. Process 60 may be performed prior to displaying externally provided content on display screen 11. Initiation process 60 may include pairing (step 601) with mobile device 12 display screen 11 and/or the application running display screen 11 installed on computer 10. Pairing (step 601) may be performed by using camera 26 of mobile device 12 to scan a two dimensional barcode, e.g. QR™ code displayed on the display screen 11 or a code printed by computer 10. Alternatively, a unique code displayed on display screen 11 may be manually entered into mobile device 12.

Upon pairing (step 601), GPS receiver 207 of mobile device 12 may provide a location (i.e., GPS coordinates) of display screen 11. If GPS accuracy or coverage is not optimal, the user may be given an option to verify an address, e.g. street address, from a selection that may be narrowed down by the internet protocol (IP) address of mobile device 12. In step 603, screen size (usually specified by the diagonal in centimetres) and orientation of screen 11 may be manually input by the user. Alternatively, camera 26 of mobile device 12 may be used with an installed software application, e.g. augmented reality software, to classify screen size and orientation. In step 605, a viewing distance for persons exposed to display screen 11 is determined. In step 607, tilt angle of display screen 11 is determined. Tilt angle θ of display screen 11 is shown in an exploded view in FIG. 3B.

Determine Viewing Range (Step 605) and Viewing Angle (Step 607)

For display screen 11 positioned for presenting information in a public space, image size, e.g. font size and corresponding recommended viewing distances may be determined by generally well known considerations. Viewing distance for a given image size may be estimated for instance based on a standard document, entitled: Display Image Size for 2D Content in Audiovisual Systems, AVIXAV202.01:2016 (Formerly ANSI/INFOCOMM V202.01:2016) May 2016. This standard is known by the acronym DISCAS and is published by: AVIXA, Audiovisual and Integrated Experience Association. Using these known considerations, image size, e.g. font size, may be determined if a viewing distance is known or if a viewing distance is known image size may be determined. Viewing distance may be determined, according to embodiments of the present invention in order to optimize exposure to the persons expected to be in the environment surrounding display screen 11. Optimal exposure may be estimated based on a survey of the environment surrounding display screen 11. Different embodiments of the present invention may use one or more of: a closest viewing distance, an optimal viewing distance and/or farthest viewing distance.

Reference is now also made to FIG. 6A, which illustrates further details of the process of determining (process 605) a viewing distance, according to embodiments of the present invention. During process 605, instructions to the user may be presented on display screen 11. In step 611, camera 26 which may be incorporated into mobile device 12 may be pointed toward display screen 11. A camera feed may be activated on mobile device 12 which presents an image of display screen 11 on display 209 of mobile device 12.

Examples showing the position of the user capturing images from the direction of screen 11 are illustrated in FIGS. 3A and 3B. Reference is now also made to FIGS. 4A, 4B and 4C which illustrate mobile device 12 and display 209 showing a feed from camera 26, according to features of the present invention. An application running on mobile device 12 presents (step 613) on display 209 an outline (dashed line) associated with screen 11 size and orientation. The feed from camera 26 shows an image of screen 11 as superimposed (step 615) on the outline. The user may be instructed to change distance (step 617) from display screen 11 until the image of display screen 11 as presented on display 209 matches the outline. FIGS. 4A, 4B and 4C illustrate display 209 of mobile device 12 as the user moves away from display screen 11. In FIG. 4A the image of display screen 11 is larger than the displayed outline (dashed line). In FIG. 4B as the distance between mobile device 12 and display screen 11 increases and the image of display screen 11 approaches the dimensions of the presented outline (dashed line) and in FIG. 4C the image of display screen 11 matches (decision 618) the dimensions of the presented outline (dashed line).

The measured viewing distance between mobile device 12 and display screen 11 may be calculated (step 619) using, for instance, pinhole camera projection, from the known real space dimensions of display screen 11, image coordinates of the outline and the known focal length of camera 26.

The measured viewing distance corresponds to the match of the image of screen 11 with the outline presented and may be used to determine optimal, closest and farthest viewing distances.

Referring back to FIG. 6, tilt angle θ (shown in exploded view of FIG. 3B) of mobile device 12 may be determined (step 607) using one or more sensors 215, e.g. accelerometer, gyroscope, incorporated into mobile device 12. Tilt angle of display screen relative to tilt angle of camera 26 of mobile device 12 may be determined (step 607) by keystone effect, for instance by comparing the difference between horizontal image coordinates corresponding to the two top corners of display screen 11 and the difference between horizontal image coordinates corresponding to the two lower corners of display screen 11. A difference of image coordinates may correspond to slightly different distance between camera 26 and the top and bottom of display screen 11 from which a difference in tilt angle may be estimated between the tilt angle of mobile device 12 and tilt angle of display screen 11.

Record Environment Surrounding Display Screen 11

Figure 7:
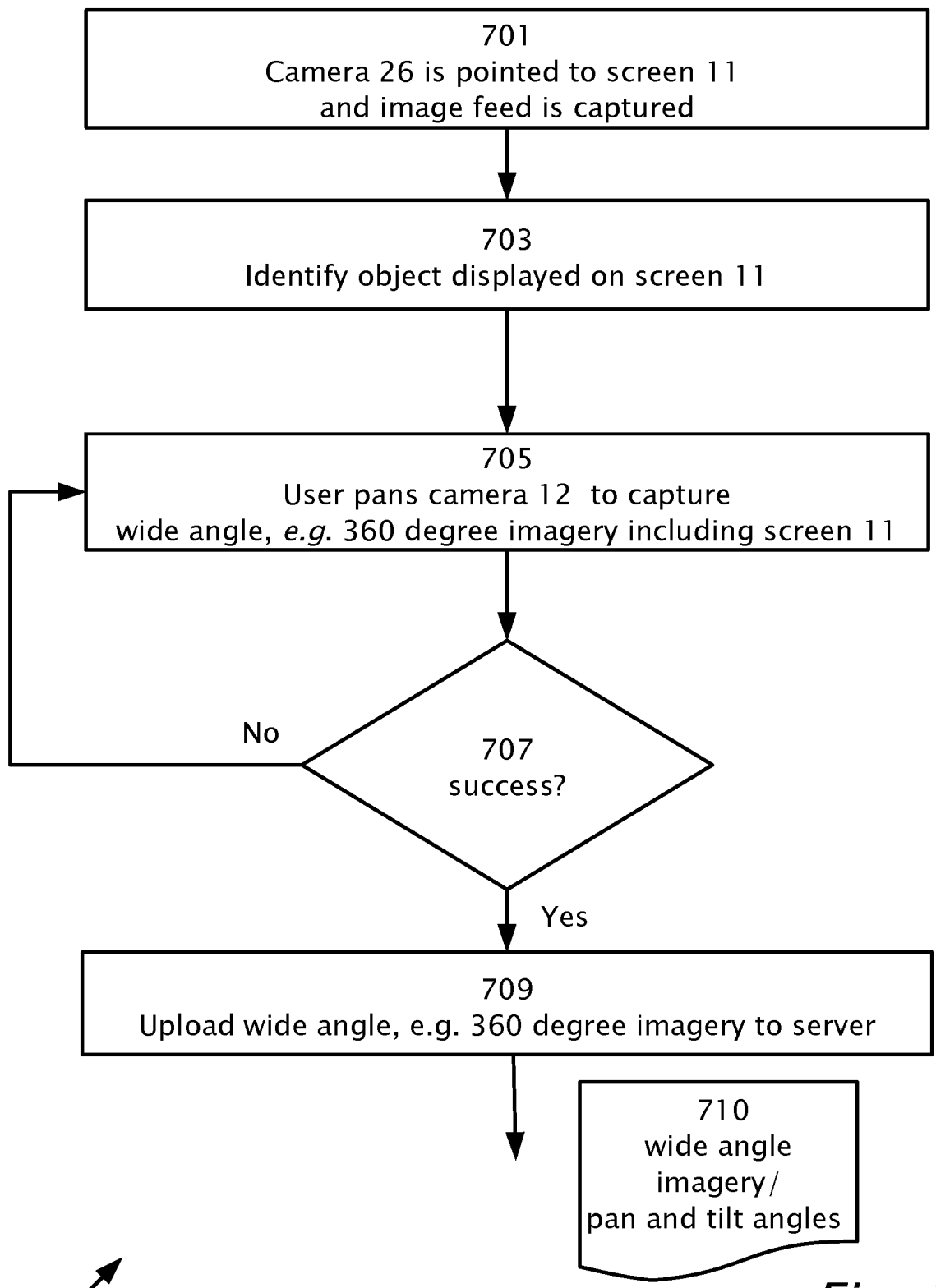
FIG. 7 shows a flow diagram illustrating a method, according to an embodiment of the present invention.

Reference is now also made to FIG. 7 illustrating a process 70 for recording a survey of the environment surrounding display screen 11, according to an embodiment of the present invention. The user may be instructed to orient camera 26 to face of screen 11 and position mobile device 12 at a viewing distance which may be the measured viewing distance determined by step 605, or another viewing distance determined from the measured viewing distance. In step 701, camera 26 is pointed toward display screen 11 and an image feed is captured and displayed on display 209 of mobile device 12. An object displayed on screen 11 may be identified, (step 703). The object identification may be used as a prompt to proceed. In step 705, camera 12 is rotated to capture wide angle, e.g. 360 degree, imagery while the pan and tilt angles are recorded using one or more sensors 215, e.g. accelerometer, gyroscope, incorporated into mobile device 12. If the image capture and angular orientation recording are successful (decision 707), wide angle imagery 710 with the recorded pan and tilt angles of the camera are uploaded to server 208. According to a feature of the present invention, an application running on mobile device 12 may guide the user visually on display 209 in which direction to point camera 26 during the wide angle capture (step 705). Reference is now made to FIGS. 5A and 5B which illustrate a feature in which the user is prompted visually on display 209 to visually guide the user to reorient (pan and tilt angles) camera 26 for the next image capture. In FIG. 5A, an arrow is displayed on display 209 overlaying the camera feed image and directs the user to reorient camera to tilt down and pan to the right. The resulting new image capture is fed to display 209 and shown in FIG. 5B. In FIG. 5B, an arrow is displayed to guide the user to the next image capture (step 705). At server 208 a computer vision analysis may be performed on the uploaded wide angle imagery 710 which may be pieced together to produce a three dimensional panorama surrounding display screen 11.

The three dimensional panorama 710 may be accessed by administrators of the system or third parties such as an advertiser, government and/or emergency services to determine if the location is suitable for communications requirements.

According to an embodiment of the present invention, camera 26 may be a 360 degree camera connectible to mobile device 12 or computer 10. With the 360 degree camera 26 ha panoramic view including display screen 11 and an environment facing display screen 11 may be captured with a button press without panning (step 705) or tilting camera 26.

A 360 degree camera is placed at a viewing distance from display screen 11. The panoramic imagery 710 may be captured by a button press. Panoramic imagery 710 may be uploaded to server 208. The image of display screen 11 and the environment facing display screen 11 may be identified in panoramic imagery 710.

Screen Sensor (Camera) Setup 71

Figure 7A:
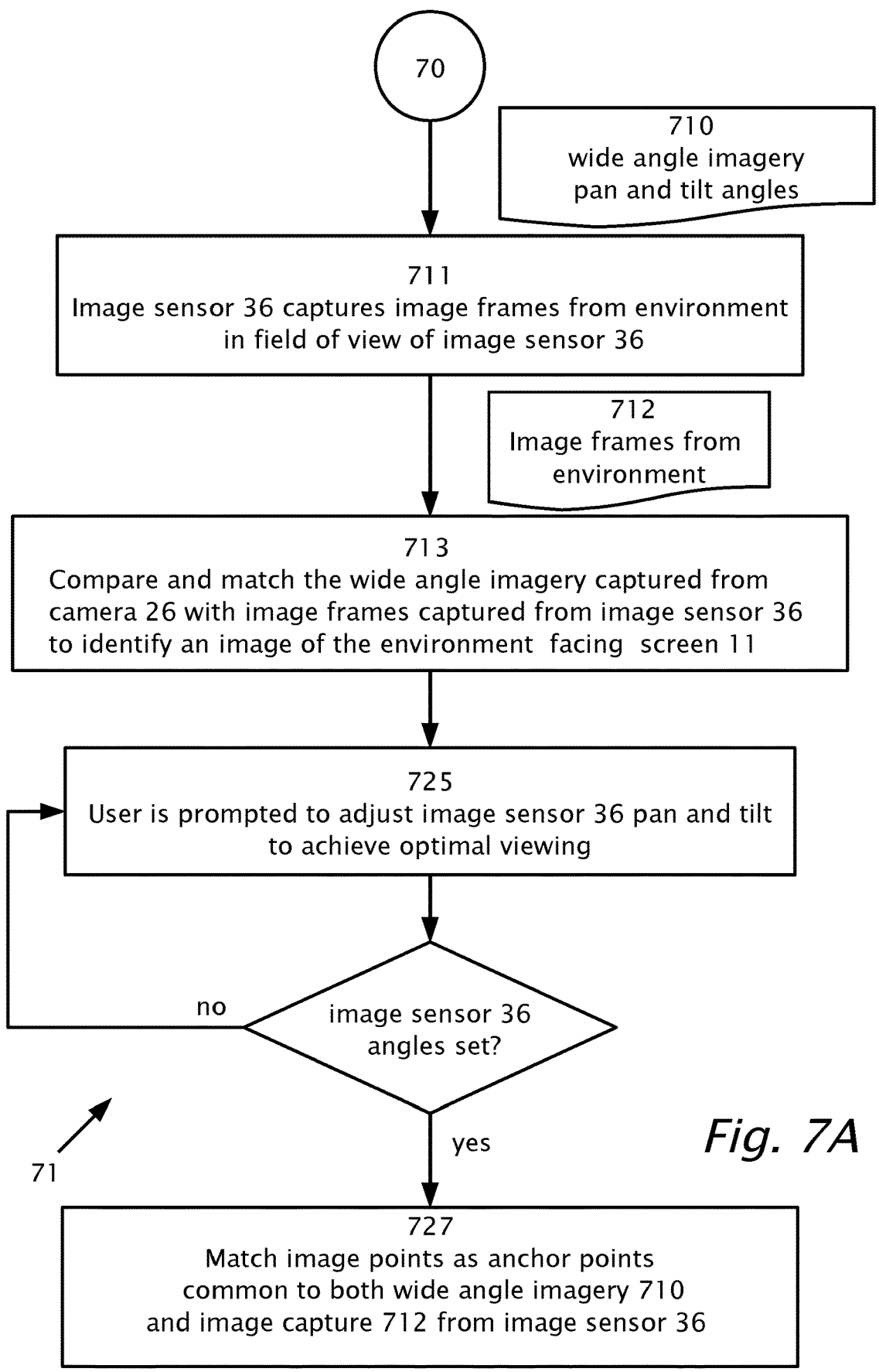
FIG. 7A shows a continuation of the flow diagram and method of FIG. 7.

Reference is now also made to FIG. 7A which illustrates process 71, according to features of the present invention, which may continue after process 70 shown in FIG. 7. Process 71 utilizes wide angle imagery 710 and respective pan and tilt angles recorded in process 70 to determine the optimal positioning, pan/tilt angles and field of view of image sensor 36. Image sensor 36 captures (step 711) images of persons and moving objects, e.g. vehicles, in the environment of display screen 11. Wide angle imagery 710 captured from camera 26 is compared and matched (step 713) with image frames 712 captured from image sensor 36 to identify an image of the environment facing screen 11. Based on the comparison between wide angle imagery 710 captured from camera 26 and image frames 712 captured from image sensor 36, the user is prompted (step 725) to adjust image sensor 36 pan and tilt angles to achieve optimal view of the environment. Adjustment of pan and tilt angles of image sensor 36 may be accomplished through directional instructions that appear on display screen 11 and are overlaid on the live video feed received from image sensor 36 so that when optimal camera angle, position and field of view are achieved, display screen 11 may display a message to the user which confirms optimal position and angular orientation of camera 36.

When optimal camera angle, position and field of view are achieved, matched image points. common to both wide angle imagery 710 and image capture 712 from image sensor 36 may be used as anchor points that may be used to detect during operation any positional or orientational changes of image sensor 36 camera optical axis.

Screen and Camera Movement Detection 80

Figure 8:
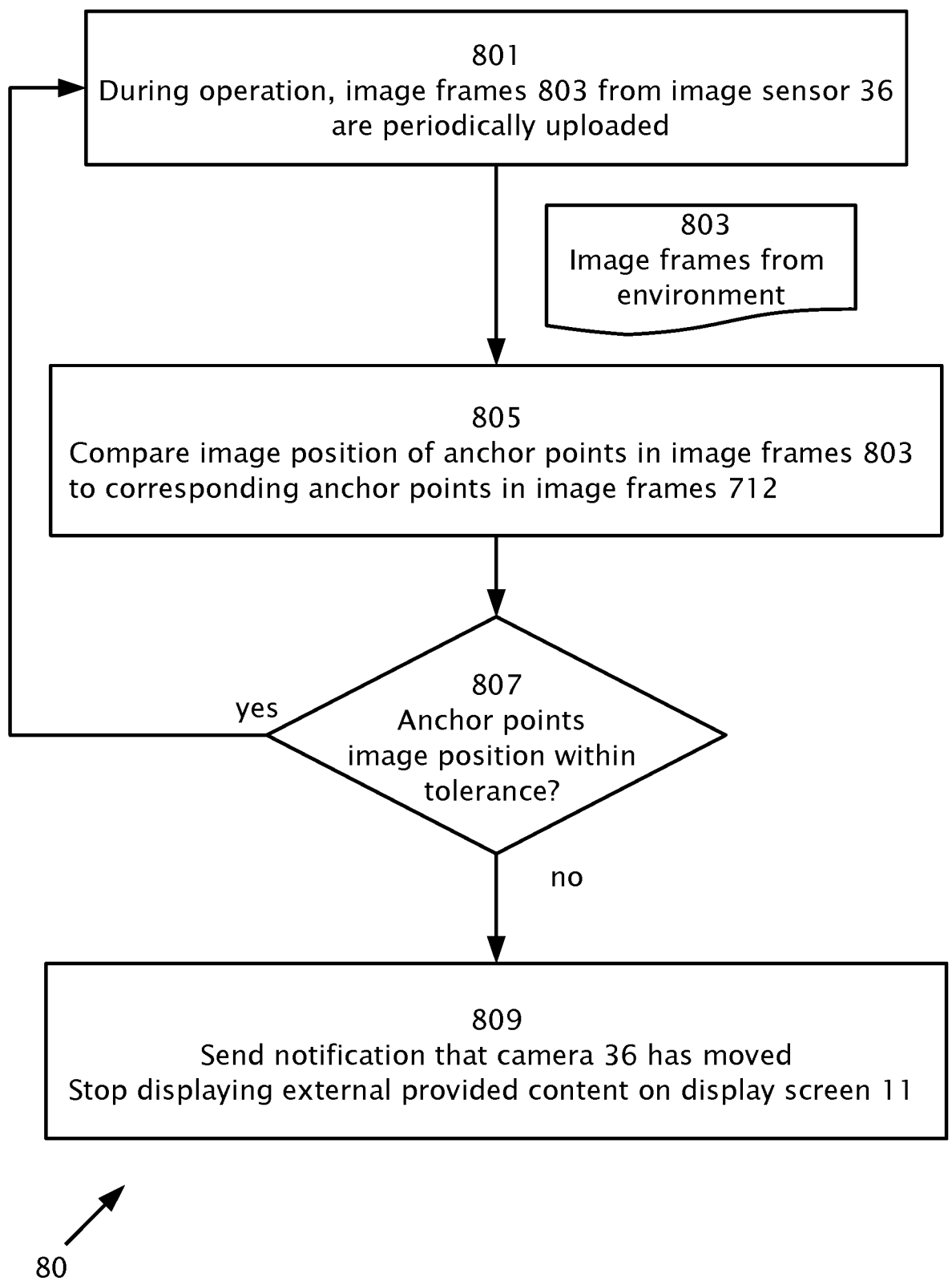
FIG. 8 show a flow diagram illustrating a method, according to an embodiment of the present invention.

Reference is now also made to FIG. 8, illustrating a process according to a feature of the present invention, for ensuring integrity that externally provided content is viewable by the public in the environment as when system 100 was originally installed. Using the anchor points matched in images 712 (step 727), images 803 captured from image sensor 36 are periodically, e.g. four per hour, uploaded (step 801) to server 208. Image position of respective anchor points are compared (step 805) in image frames 803 to corresponding anchor points originally captured in image frames 712. If there has been a change of image location of the anchor points within a previously defined error tolerance threshold, (decision 807) then a notification is sent that camera 36 has moved and the display screen 11 is stopped from displaying externally provided content. When image sensor 36 is incorporated into and/or mounted on display screen 11, then process 80 may also detect a movement of display screen 11. System 10 may disable display screen 11 from receiving and displaying externally provided content when: there is a lapse of Internet connection or change in SSID of computer 10; if there is detected change of display screen 10 which may be detected through the HDMI cable connecting computer 10 to display screen 10; and/or if computer 10 does not detect a display screen 11 for more than a previously defined period of time. If image sensor 36 is not connected, system 100 will notify the installer with a prompt on display screen 11 or on mobile device 12.

The embodiments of the present invention may comprise a general-purpose or special-purpose computer system including various computer hardware components, which are discussed in greater detail herein. Embodiments within the scope of the present invention also include computer-readable media for carrying or having computer-executable instructions, computer-readable instructions, or data structures stored thereon. Such computer-readable media may be any available media, transitory and/or non-transitory which is accessible by a general-purpose or special-purpose computer system. By way of example, and not limitation, such computer-readable media can comprise physical storage media such as RAM, ROM, EPROM, flash disk, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a smartphone, Personal Digital Assistant "PDA" and/or tablet) where internal modules (such as a memory and processor) work together to perform operations on electronic data. While any computer system may be mobile, the term "mobile computer system" especially includes laptop computers, net-book computers, tablets, cellular telephones, smart-phones, wireless telephones, personal digital assistants, portable computers with touch sensitive screens and the like.

In this description and in the following claims, a "network" is defined as any architecture where two or more computer systems may exchange data. The term "network" may include wide area network, Internet local area network, Intranet, wireless networks such as "Wi-fi", virtual private networks, mobile access network using access point name (APN) and Internet. Exchanged data may be in the form of electrical signals that are meaningful to the two or more computer systems. When data is transferred or provided over a network or another communications connection (either hard wired, wireless, or a combination of hard wired or wireless) to a computer system or computer device, the connection is properly viewed as a computer-readable medium. Thus, any such connection is properly termed a computer-readable medium. Combinations of the above should also be included within the scope of computer-readable media. Computer-executable instructions comprise, for example, instructions and data which cause a general-purpose computer system or special-purpose computer system to perform a certain function or group of functions.

The term "server" as used herein, refers to a computer system including a processor, data storage and a network adapter generally configured to provide a service over the computer network. A computer system which receives a service provided by the server may be known as a "client" computer system.

The term "viewing distance" as used herein, may be one or more of a closest viewing distance", optimal viewing distance or farthest viewing distance from a display screen presenting a known image or font size to persons expected to be exposed to the display screen.

The term "facing" as used herein, referring to facing display screen 11 refers to an angle of a an unobscured line of sight from an imagined person viewing the screen to a normal to the screen, the angle less than or equal to thirty degrees (absolute value) or less than or equal to 45 degrees (absolute value).

The term "panoramic camera" refers to a camera with a very wide field of view greater than 180 degrees configured to capture up to 360 degree panoramic view with a single button press.

The term "pointing" as used herein referring to "pointing a camera" refers to orienting and holding the camera with an object in the field of view of the camera.

The term "toward" as used herein referring to point a camera toward an object includes having the object in the field of view of the camera, or having a vertical projection of the object in the field of view of the camera.

The term "outline as used herein include a plurality of displayed points, line segments and/or characters which may define a rectangle on a display.

The term "orientation" as used herein referring to display screen 11, is either a "landscape" orientation in which the longer dimension is essentially horizontal or a "portrait" orientation in which the longer dimension is essentially vertical.

The term "height" as used herein referring to display screen 11 refers to a height measured from the ground or floor to a point on display screen 11.

The articles "a", "an" is used herein, such as "an image frame", "a server", "a camera" have the meaning of "one or more" that is "one or more image frames", "one or more servers" and "one or more cameras".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features. Instead, it is to be appreciated that changes may be made to these features, the scope of which is defined by the claims and the equivalents thereof.

The claimed invention is:

1. A method for initiating a display screen for presenting information, the method comprising: pointing a camera toward the display screen;
   panning the camera while capturing a plurality of image frames from the camera from an environment surrounding the camera;
   during said panning, storing respective pan and tilt angles of the camera respectively associated with capture times of the image frames;
   upon completing capture of the image frames, analysing the image frames and the respective pan and tilt angles to identify an image of the environment facing the display screen;
   wherein an image sensor is associated with and installed in the vicinity of the display screen or attached to the display screen;
   capturing image frames from the image sensor from a portion of the environment; and
   matching an image feature captured from the image sensor with an image feature captured from the camera of the environment facing the display screen.

2. The method of claim 1, further comprising:
   displaying an object on the display screen;
   capturing an image frame from the camera including at least a portion of the display screen;
   performing said panning and said capturing upon identifying the object displayed on the display screen.

3. The method of claim 1, further comprising:
   uploading to a server the image frames from the camera and the respective pan and tilt angles of the camera.

4. The method of claim 1, further comprising:
   responsive to a previously determined viewing distance from the display screen of persons expected to be exposed to the display screen, adjusting at least one of: an angle of the image sensor and a position of the image sensor.

5. The method of claim 4, wherein said adjusting is performable by providing directional instructions on the display screen.

6. The method of claim 4, further comprising:
   during said adjusting, presenting on the display screen a video feed from the image sensor.

7. The method of claim 4, further comprising:
   upon completing said adjusting, selecting the matched image feature captured from the image sensor and from the camera as an anchor point in an image frame captured from the image sensor.

8. The method of claim 7, further comprising:
   during operation of presenting information by the display screen, uploading an image frame captured from the image sensor including the anchor point;
   upon a change of an image coordinate of the anchor point greater than a previously determined threshold, stopping the operation of presenting externally provided information on the display screen.

9. The method of claim 4, wherein said viewing distance is previously determined by:
   pointing the camera of a mobile device toward the display screen and presenting an image of the display screen on a display of the mobile device;
   determining screen size and orientation of the display screen from an image frame captured from the camera, or inputting a screen size and orientation of the display screen using an input mechanism of the mobile device;
   responsive to the screen size and orientation of the display screen, presenting on the display of the mobile device an outline associated with the display screen size and orientation of the display screen;
   while the mobile device is pointed toward the display screen and presenting an image of the display screen on the display of the mobile device, changing distance of the mobile device from the display screen until an image of the display screen matches the outline associated with the screen size and orientation of the display screen.

10. The method of claim 9, further comprising:
    pairing the mobile device with the display screen by inputting into the mobile device a unique code displayed on the display screen.

11. The method of claim 10 further comprising:
    upon pairing, providing a location of the mobile device.

12. A method for determining a viewing distance to a display screen, the method comprising:
    pointing the camera of a mobile device toward the display screen and presenting an image of the display screen on a display of the mobile device and determining screen size and orientation of the display screen from an image frame captured from the camera, or inputting a screen size and orientation of the display screen using an input mechanism of the mobile device;
    responsive to the screen size and orientation of the display screen, presenting on the display of the mobile device an outline associated with size and orientation of the display screen;
    while the mobile device is pointed toward the display screen and presenting an image of the display screen on the display of the mobile device, changing distance of the mobile device from the display screen until the image of the display screen matches the outline associated with the size and the orientation of the display screen.

13. The method of claim 12, further comprising:
    pairing the mobile device with the display screen by inputting into the mobile device a unique code displayed on the display screen.

14. The method of claim 12, further comprising:
    pointing the camera toward the display screen;
    panning the camera while capturing image frames from the camera from an environment surrounding the camera including the display screen;
    during said panning, storing respective pan and tilt angles respectively associated with capture of the image frames from the camera;
    upon completing capture of the image frames from the camera, analysing the image frames from the camera and the respective pan and tilt angles to identify an image of the environment facing the display screen;
    wherein an image sensor is associated with and installed in the vicinity of the display screen, or attached to the display screen;

capturing image frames from the image sensor from a portion of the environment; and matching a portion of the image frames from the image sensor with the image of the environment captured from the camera facing the display screen.

15. The method of claim 14, further comprising:
displaying an object on the display screen;
capturing an image frame from the camera including at least a portion of the display screen; and
performing said panning upon identifying the object displayed on the display screen.

16. The method of claim 14, further comprising:
uploading to a server the image frames from the camera and the respective pan and tilt angles of the camera.

17. A graphical user interface of a mobile device including or connected to: a camera and a display, the graphical user interface configured for determining a viewing distance from a display screen configured to present information, the graphical user interface comprising:

a field for inputting a screen size and orientation of the display screen using an input mechanism of the mobile device or for presenting display screen size and orientation of the display screen;

an outline associated with the display screen size and orientation of the display screen responsive to the screen size and orientation of the display screen;

an image of the display screen superimposed on the outline; and an indication that the viewing distance is determined when the image of the display screen matches the outline.

18. The graphical user interface of claim 17, further comprising:

a message for pairing the mobile device with the display screen by inputting into the mobile device a unique code displayed on the display screen.

* * * * *